US010846385B1

(12) United States Patent
Walters et al.

(10) Patent No.: US 10,846,385 B1
(45) Date of Patent: Nov. 24, 2020

(54) SYSTEMS AND METHODS FOR USER-AUTHENTICATION DESPITE ERROR-CONTAINING PASSWORD

(71) Applicant: Capital One Services, LLC, McLean, VA (US)

(72) Inventors: Austin Walters, Savoy, IL (US); Jeremy Edward Goodsitt, Champaign, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/599,323

(22) Filed: Oct. 11, 2019

(51) Int. Cl.
G06F 21/31 (2013.01)
G06F 21/40 (2013.01)

(52) U.S. Cl.
CPC ............ G06F 21/316 (2013.01); G06F 21/40 (2013.01)

(58) Field of Classification Search
None
See application file for complete search history.

(56) References Cited

U.S. PATENT DOCUMENTS

| 6,026,491 | A | 2/2000 | Hiles | |
| 8,572,684 | B1* | 10/2013 | Sama | H04L 63/0838 726/2 |
| 9,300,661 | B1* | 3/2016 | O'Malley | H04L 63/0861 |
| 2003/0006973 | A1 | 1/2003 | Omura | |
| 2004/0162999 | A1 | 8/2004 | Schreiber et al. | |
| 2005/0149763 | A1 | 7/2005 | Nakao | |
| 2005/0289645 | A1 | 12/2005 | Hori | |
| 2006/0085844 | A1 | 4/2006 | Buer | |
| 2007/0107051 | A1 | 5/2007 | Carter | |
| 2008/0066167 | A1* | 3/2008 | Andri | G06F 21/46 726/5 |
| 2010/0115583 | A1 | 5/2010 | Delia et al. | |
| 2014/0165169 | A1* | 6/2014 | Buck | G06F 21/31 726/7 |
| 2019/0174304 | A1* | 6/2019 | Tunnell | H04W 12/003 |

* cited by examiner

Primary Examiner — Benjamin E Lanier
(74) Attorney, Agent, or Firm — Troutman Pepper Hamilton Sanders LLP; Christopher J. Forstner; John A. Morrissett

(57) ABSTRACT

In an example embodiment, a system for allowing one or more password errors may store a correct password for a user and receive an attempted login from a user device. The attempted login may include (1) an attempted password with one or more errors and (2) metadata. The system may assign a metadata risk score to the metadata, assign a password risk score to the attempted password, aggregate the scores, and grant or deny access to the user based on the aggregated score and a predetermined threshold.

30 Claims, 5 Drawing Sheets

SYSTEMS AND METHODS FOR USER-AUTHENTICATION DESPITE ERROR-CONTAINING PASSWORD

FIELD OF INVENTION

The present disclosure relates to systems for authenticating a user when an attempted password includes one or more errors.

BACKGROUND

When attempting to access a computing device (e.g., computer, smart phone, tablet, etc.), application, website, network, etc., users are often presented with a login prompt that requires the user to enter a username and password that can be authenticated in order to access the computing device, application, website, network, etc. If a user enters an incorrect password (e.g., with one or more wrong characters), the user is denied access. If a user enters an incorrect password too many times (e.g., three or more times), then the user may be locked out for a predetermined amount of time (e.g., 10 minutes, 3 hours, 24 hours) or indefinitely. Worse yet, secure computers, smart phones, or tablets may wipe (i.e., delete) all data and/or all secure data on the device after a predetermined number of failed login attempts.

There are legitimate reasons for entering an incorrect password. If a user is using a smart phone or tablet, the user's fingers may be larger than the virtual keys on the screen, causing the user to accidently type a wrong character. If a user is typing too fast, he may be more prone to accidently typing a wrong character. Also, if the user simply has a habit of always mistyping a certain key on a keyboard (e.g., an "f" for a "g"), then the user may mistype a password with the certain key. Similarly, if the user typically uses variations of the same password or rotates between a few passwords when required to update the password, he may have simply forgotten which variation or password is current for that particular device, application, website, or network. There is a need for systems and methods that are more accommodating to authorized users while remaining secure against non-authorized third parties.

SUMMARY

Disclosed embodiments provide systems and methods for granting user access (e.g., to a device, application, website, network, etc.) when an attempted password includes at least one error.

Consistent with the disclosed embodiments, an example embodiment of a system may include one or more processors and a memory in communication with the one or more processors and storing instructions that when executed by the one or more processors, are configured to cause the system to perform steps of a method. The method may include storing a correct password for a user and receiving, from a user device, an attempted login including (1) an attempted password including a plurality of characters with at least one character error, and (2) metadata such as, for example, user device location information, media access control identification (MAC ID) of the user device, and an attempted login time. The method may also include assigning a metadata risk score to the metadata, assigning a password risk score to the attempted password, aggregating the metadata risk score and the password risk score to generate an aggregated score, and granting or denying access to the user based on the aggregated score and a predetermined threshold.

In another example embodiment, a system may include one or more processors and a memory in communication with the one or more processors and storing instructions that when executed by the one or more processors, are configured to cause the system to perform steps of a method. The method may include storing a correct password for a user and receiving, from a user device, an attempted login including (1) an attempted password including a plurality of characters with at least one character error, and (2) metadata such as, for example, user device location information, MAC ID of the user device, and an attempted login time. The method may also include assigning a metadata risk score to the metadata, assigning a password risk score to the attempted password, setting a password risk threshold based on the metadata risk score, and grant or deny access to the user based on the password risk score and the password risk threshold.

In yet another example embodiment, a system may include one or more processors and a memory in communication with the one or more processors and storing instructions that when executed by the one or more processors, are configured to cause the system to perform steps of a method. The method may include storing a correct password and receiving, from a user device, an attempted login including (1) an attempted password including a plurality of characters with at least one character error, and (2) metadata such as, for example, user device location information, MAC ID of the user device, and an attempted login time. The method may also include assigning a metadata risk score to the metadata, assigning a password risk score to the attempted password, setting a metadata risk threshold based on the assigned password risk score, and granting or denying access to the user based on the metadata risk score and the metadata risk threshold.

Further features of the disclosed systems and methods are explained in greater detail hereinafter with reference to example embodiments illustrated in the accompanying drawings.

BRIEF DESCRIPTION OF THE DRAWINGS

Reference will now be made to the accompanying drawings, which are not necessarily drawn to scale, and which are incorporated into and constitute a portion of this disclosure and illustrate various implementations and aspects of example embodiments. In the drawings.

DETAILED DESCRIPTION

Figure 1:
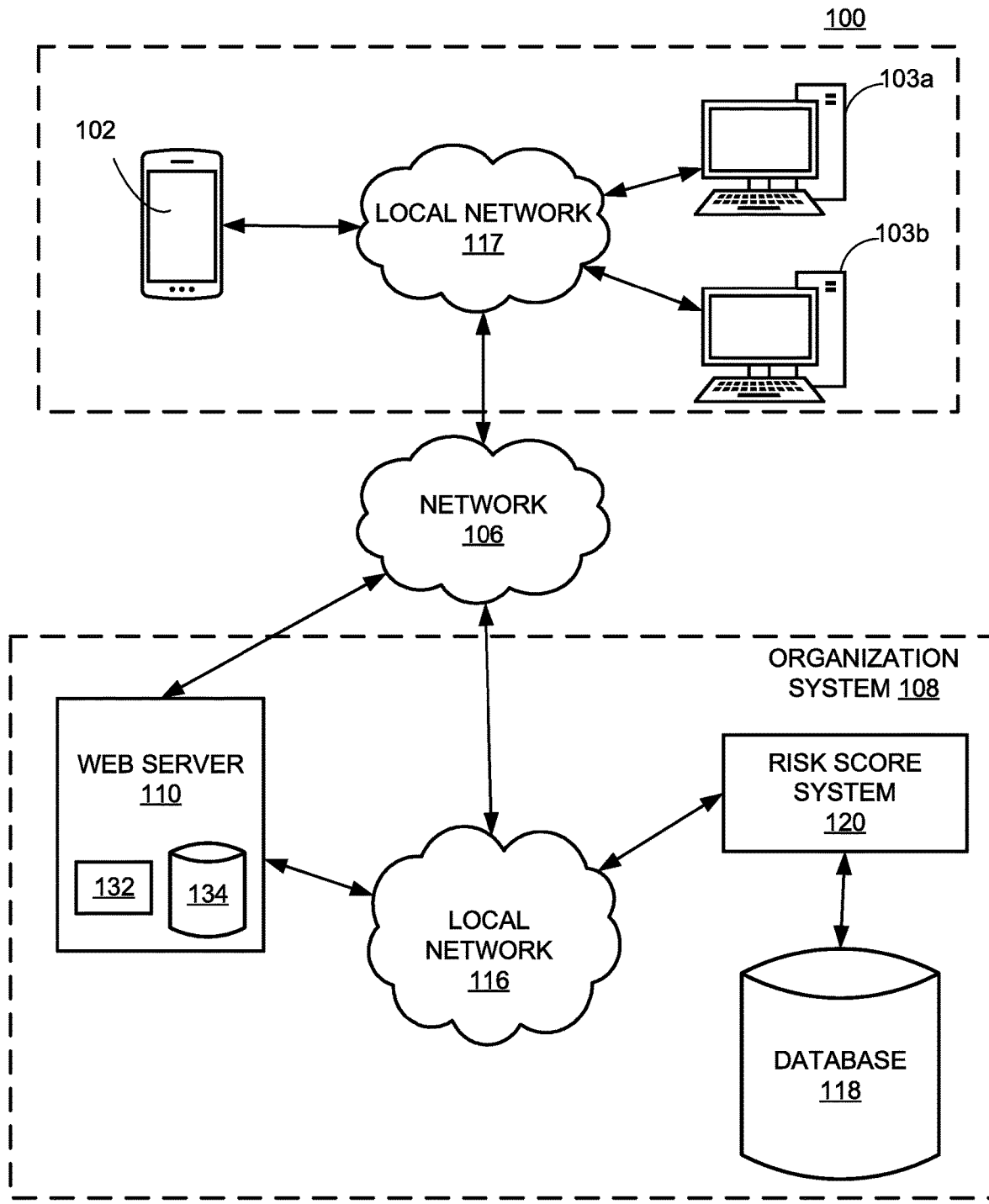
FIG. 1 is a diagram of an example system for granting access to a user.

Some implementations of the disclosed technology will be described more fully with reference to the accompanying drawings. This disclosed technology may, however, be embodied in many different forms and should not be construed as limited to the implementations set forth herein. The components described hereinafter as making up various elements of example embodiments are intended to be examples and not restrictive. Many suitable components that would perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used in the specification, including the claims, "based on" is not exclusive and allows for being based on additional factors not described.

In one example, the system may include one or more processors and a memory in communication with the one or more processors and storing instructions that when executed by the one or more processors, are configured to cause the system to perform steps of a method. The method may include storing a correct password for a user and receiving, from a user device, an attempted login including (1) an attempted password including a plurality of characters, wherein the plurality of characters may include at least one character error, and (2) metadata, wherein the metadata may include user device location information, media access control identification (MAC ID) of the user device, and/or an attempted login time. The method may also include assigning a metadata risk score to the metadata, assigning a password risk score to the attempted password, aggregating the metadata risk score and the password risk score to generate an aggregated score, and granting or denying access to the user based on the aggregated score and a predetermined threshold. For example, the system may grant or deny access to the user based on whether the aggregated score is below the predetermined threshold. For example, the system may grant access to the user if the aggregated score is below the predetermined threshold, and may otherwise deny access. As another example, the system may grant or deny access to the user based on whether the aggregated score is above the predetermine threshold. Other variations may be used.

In one example, the system may include one or more processors and a memory in communication with the one or more processors and storing instructions that when executed by the one or more processors, are configured to cause the system to perform steps of a method. The method may include storing a correct password for a user and receiving, from a user device, an attempted login including (1) an attempted password including a plurality of characters, wherein the plurality of characters may include at least one character error, and (2) metadata, wherein the metadata may include user device location information, media access control identification (MAC ID) of the user device, and/or an attempted login time. The method may also include assigning a metadata risk score to the metadata, assigning a password risk score to the attempted password, setting a password risk threshold based on the metadata risk score, and granting or denying access to the user based on the password risk score and the password risk threshold.

In one example, the system may include one or more processors and a memory in communication with the one or more processors and storing instructions that when executed by the one or more processors, are configured to cause the system to perform steps of a method. The method may include storing a correct password for a user and receiving, from a user device, an attempted login including (1) an attempted password including a plurality of characters, wherein the plurality of characters may include at least one character error, and (2) metadata, wherein the metadata may include user device location information, media access control identification (MAC ID) of the user device, and/or an attempted login time. The method may also include assigning a metadata risk score to the metadata, assigning a password risk score to the attempted password, setting a metadata risk threshold based on the password risk score, and granting or denying access to the user based on the metadata risk score and the metadata risk threshold.

In some embodiments, assigning the metadata risk score may be based on the user device location information, the MAC ID of the user device, the attempted login time, or some combination thereof. The user device location information may include a geographical location of the user device based on global positioning system (GPS) data, an Internet protocol address, cellular triangulation data, or some combination thereof. In an example embodiment, the metadata risk score may be based on (a) the user device location information and a previous user device location information, (b) the MAC ID of the user device and a stored MAC ID, (c) the attempted login time and previous attempted login times, or (d) some combination thereof.

In some embodiments, assigning the password risk score may be based on a quantity of character errors the attempted password contains, a distance on a keyboard the at least one character error is from a corresponding correct character, a typing speed of the attempted password, an incorrect password history, or some combination thereof.

In some embodiments, the incorrect password history may include, for example, a frequency of password errors and/or a common historical error. In some examples, assigning the password risk score based on an incorrect password history may include assigning the password risk score based on determining whether the at least one character error matches the common historical error.

Reference will now be made in further detail to additional example embodiments of the disclosed technology, examples of which are illustrated in the accompanying drawings and disclosed herein.

FIG. 1 is a diagram of an example system 100 that may be configured to perform one or more processes for securely and selectively granting access to a user attempting to log into a device, application, website, network, or other secure interface with a password that contains at least one error. The components and arrangements shown in FIG. 1 are not intended to limit the disclosed embodiments as the components used to implement the disclosed processes and features may vary. As shown, system 100 may include a plurality of user devices (e.g., a first user device 102 and secondary user devices 103a and 103b) configured to communicate with one another via a local network 117 and to communicate via a network 106 with one or more devices in an organization system 108, which may include, for example, a web server 110, a database 118, and a risk score system 120 that may communicate within organization system 108 via another local network 116.

In some embodiments, a customer may operate a first user device 102 and/or one or more a secondary user devices 103a and 103b (which may be collectively referred to as user devices 102, 103). User devices 102, 103 can each include one or more of a mobile device, smart phone, general purpose computer, tablet computer, laptop computer, telephone, PSTN landline, smart wearable device, other mobile computing device, or any other device capable of communicating with other devices (e.g., including those of organization system 108) via one or more of first local network 117 and network 106. In some embodiments, user devices 102, 103 may include or incorporate electronic communication devices for hearing or vision impaired users. User devices 102, 103 may belong to or be provided by a user, or may be borrowed, rented, or shared. According to some embodiments, user devices 102, 103 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Local network 117 may comprise any type of computer networking arrangement used to exchange data in a localized area, such as WiFi, Bluetooth™, Ethernet, and other suitable network connections that enable user devices 102, 103 to interact with one another and to connect to network 106 for interacting with components in system environment 100. In some embodiments, local network 117 may comprise an interface for communicating with or linking to network 106. In some embodiments, local network 117 may include a home network, such as a LAN or WLAN set up in a user's house. In some embodiments, local network 117 may be commonly used network of a local business, such as, for example, a Wi-Fi network at a particular coffee shop.

Network 106 may be of any suitable type, including individual connections via the internet such as cellular or WiFi networks. In some embodiments, network 106 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization system 108 may be associated with an entity such as a business, corporation, individual, partnership, or any other group that provides one or more of goods, services, and consultations to individuals who are or potentially are consumers of those goods, services, and consultations.

Organization system 108 may include one or more servers, devices, and computer systems for performing one or more functions associated with products and/or services that the entity associated with the organization system 108 provides. Such servers, devices, and computer systems may include, for example, web server 110 and risk score system 120, as well as any other computer systems necessary to accomplish tasks associated with organization system 108.

Web server 110 may include a computer system configured to generate and provide one or more websites accessible to customers, as well as any other individuals involved in organization system 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices or systems (e.g., risk score system 120) of system 100. In some embodiments, web server 110 may host websites or applications that may be accessed by one or more user devices 102, 103. For example, web server 110 may host a financial service provider website that a user device may access by providing an attempted login that are authenticated by the risk score system 120. Web server 110 may provide functionality to allow an authenticated user to execute transactions, such as initiating money transfers, bill payments, and other such financial service transactions. According to some embodiments, web server 110 may include software tools, similar to those described with respect to user device 102 above, that may allow web server 110 to obtain network identification data from user device 102, or one or more other devices 103 connected to local network 117.

Local networks 116 may comprise any type of computer networking arrangement used to exchange data in a localized area, such as WiFi, Bluetooth™, Ethernet, and other suitable network connections that enable components of organization system 108 to interact with one another and to connect to network 106 for interacting with components in system environment 100. In some embodiments, local network 116 may comprise an interface for communicating with or linking to network 106. In other embodiments, components of organization system 108 may communicate via network 106, without a separate local network 116.

In an embodiment, the risk score system 120 may include a computer system configured to receive an attempted login including metadata and an attempted password, assign metadata risk score to the metadata (e.g., user device location information, MAC ID of the user device, and an attempted login time) and a password risk score to an attempted password, aggregate the metadata risk score and the password risk score, determine whether the aggregated score is below a predetermined threshold, grant access to a user device when the aggregated score is below the predetermined threshold, and deny access to a user device when the aggregated score is not below the predetermined threshold (instead or in addition to determining whether the score is below a predetermined threshold, an example embodiment may determine whether the score is above (or at or above) a predetermined threshold, and granting or denying access may be based on said determination). In some embodiments, the metadata risk score may represent a score based on metadata of how likely it is that the user (e.g., of user device 102) is the authorized user associated with a username and password (or associated with a user profile). Similarly, in some embodiments, the password risk score may represent a score based on an attempted password of how likely it is that the user is the authorized user associated with a username and password (or associated with a user profile). In some embodiments, a metadata risk score and a password risk score may each be a number. For example, a metadata risk score or a password risk score may be a number between 0 and 100, a percentage, a ratio, a 32 bit floating point number between 0 and 1, or any other suitable scale. According to some embodiments, risk score system 120 may assign or generate a metadata risk score based on metadata associated with a particular username and password, which may be associated with a particular user profile. In some embodiments, the risk score system 120 may assign (or generate) a lower metadata risk score when the user device location information matches a previous user device location information, when the MAC ID of the user device matches a stored MAC ID, or when the attempted login time falls within a predetermined range of times based on previous attempted login times than when the opposite is true for any of these scenarios. According to some embodiments, system 120 may assign or generate a password risk score based on an attempted password and a correct password associated with a user profile, a quantity of character errors the attempted password contains, a distance a keyboard the at least one character error is from a corresponding correct character, at least in part on a received typing speed of the attempted password, and/or at least in part on an incorrect password history (e.g., a frequency of password errors and a common historical error). In some embodiments, the risk score system 120 may assign (or generate) a lower password risk score when a frequency of password errors increases, at least one character error in an attempted password matches the common error, and/or a received typing speed of the attempted password is higher than a predetermined threshold. In other embodiments, the risk score system 120 may assign (or generate) a higher password risk score when the at least one character error does not match the common error.

According to some embodiments, the risk score system 120 may assign or generate a metadata risk score and a password risk score based on the number and/or the nature of the overlapping data points. For example, the risk score system 120 may include an algorithm that generates a metadata risk score that compares the metadata of the current attempted login to metadata of previous attempted logins to determine whether the logins are fall within a typical pattern. As another example, the risk score system 120 may include an algorithm that generates a password risk score that compares the current attempted password to a correct password while taking into account previous attempted passwords.

Although the present disclosure describes the creation of a metadata risk score and a password risk score by using one or more algorithms, it should be understood that the process used to generate a aggregated score may vary among different embodiments, and may further vary over time as the system 100 may use machine learning techniques to refine the algorithms and input data used. Accordingly, the algorithms used by system 100 may be flexible and adaptive. In some embodiments, the algorithm may weight one or more particular data points or scores more heavily than others in generating an aggregated score. The weighting of data points may be manually changed by an operator of system 100 or may be automatically changed by implementing machine learning techniques on system 100.

Although the preceding description describes various functions of user devices 102, 103, web server 110, database 118, and risk score system 120, in some embodiments, some or all of these functions may be carried out by a single computing device.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
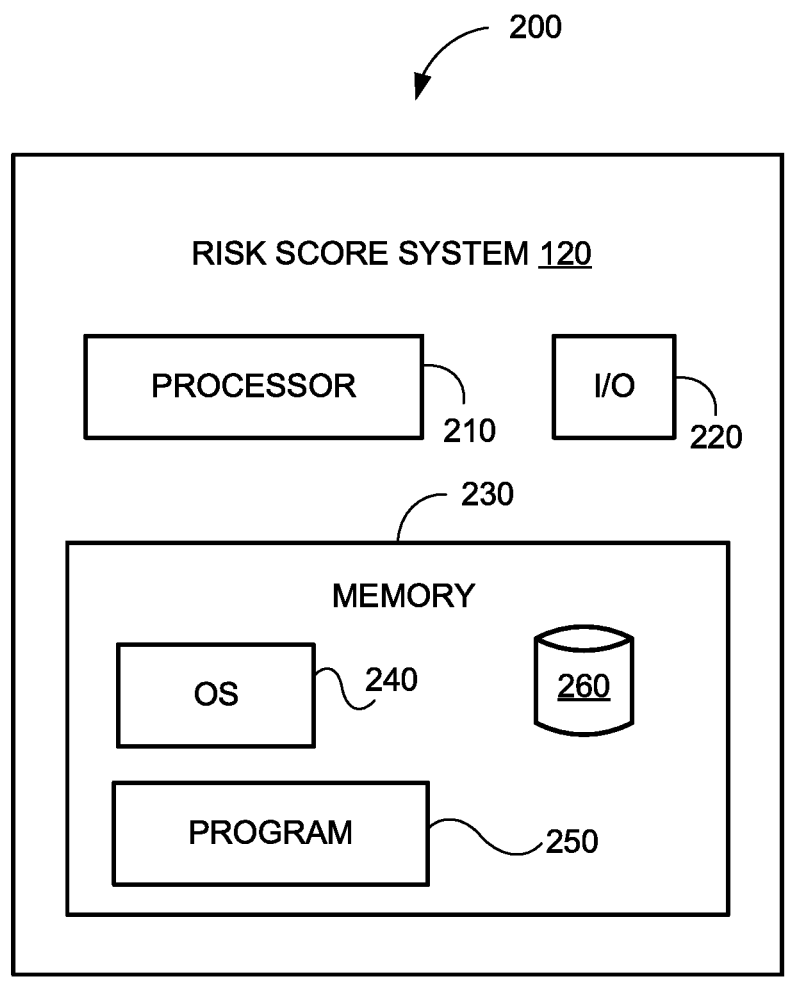
FIG. 2 is a component diagram of an example risk score system.

An example embodiment of risk score system 120 is shown in more detail in FIG. 2. Web server 110 and/or user devices 102, 103 may have a similar structure and may include many components that are similar to or even have the same capabilities as those described with respect to risk score system 120. As shown, risk score system 120 may include a processor 210, an input/output ("I/O") device 220, a memory 230 containing an operating system ("OS") 240 and a program 250. For example, risk score system 120 may be a single device or server or may be configured as a distributed computer system including multiple servers, devices, or computers that interoperate to perform one or more of the processes and functionalities associated with the disclosed embodiments. In some embodiments, risk score system 120 may further include a peripheral interface, a transceiver, a mobile network interface in communication with the processor 210, a bus configured to facilitate communication between the various components of risk score system 120, and a power source configured to power one or more components of risk score system 120.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Risk score system 120 may include one or more storage devices configured to store information used by processor 210 (or other components) to perform certain functions related to the disclosed embodiments. In some embodiments, risk score system 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, risk score system 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, risk score system 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, risk score system 120 may include a metadata and password risk scoring program 250 that is a rules-based program for assigning or generating a metadata risk score that may represent how closely metadata (e.g., user device location information, MAC ID of the user device, and an attempted login time) associated with an attempted login corresponds to metadata associated with previous attempted logins and assigning or generating a password risk score that may represent how closely an attempted password corresponds to previous attempted passwords and a correct password.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable risk score system 120 to perform one or more of the processes and functionalities associated with the disclosed embodiments.

Risk score system 120 may also be communicatively connected to one or more memory devices (e.g., databases) locally or through a network. The remote memory devices may be configured to store information and may be accessed and/or managed by NCS device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Risk score system 120 may also include one or more I/O devices 220 that may comprise one or more interfaces for receiving signals or input from devices and providing signals or output to one or more devices that allow data to be received and/or transmitted by risk score system 120. For example, risk score system 120 may include interface components, which may provide interfaces to one or more input devices, such as one or more keyboards, mouse devices, touch screens, track pads, trackballs, scroll wheels, digital cameras, microphones, sensors, and the like, that enable risk score system 120 to receive data from one or more users.

In example embodiments of the disclosed technology, risk score system 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Moving now back to FIG. 1, database 118 may be a database associated with organization system 108 and may store a variety of information relating to users, transactions, user credentials (e.g., user names and passwords), customer networks and devices, and business operations. Database 118 may also serve as a back-up storage device and may contain data and information that is also stored on, for example, local databases associated with web server 110, risk score system 120. Database 118 may be accessed by other devices or systems (e.g., risk score system 120) and may be used to store records of every interaction, communication, and/or transaction a particular user has had with organization system 108.

While web server 110 and risk score system 120 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110 and risk score system 120 may include a greater or lesser number of components than those illustrated.

Figure 3:
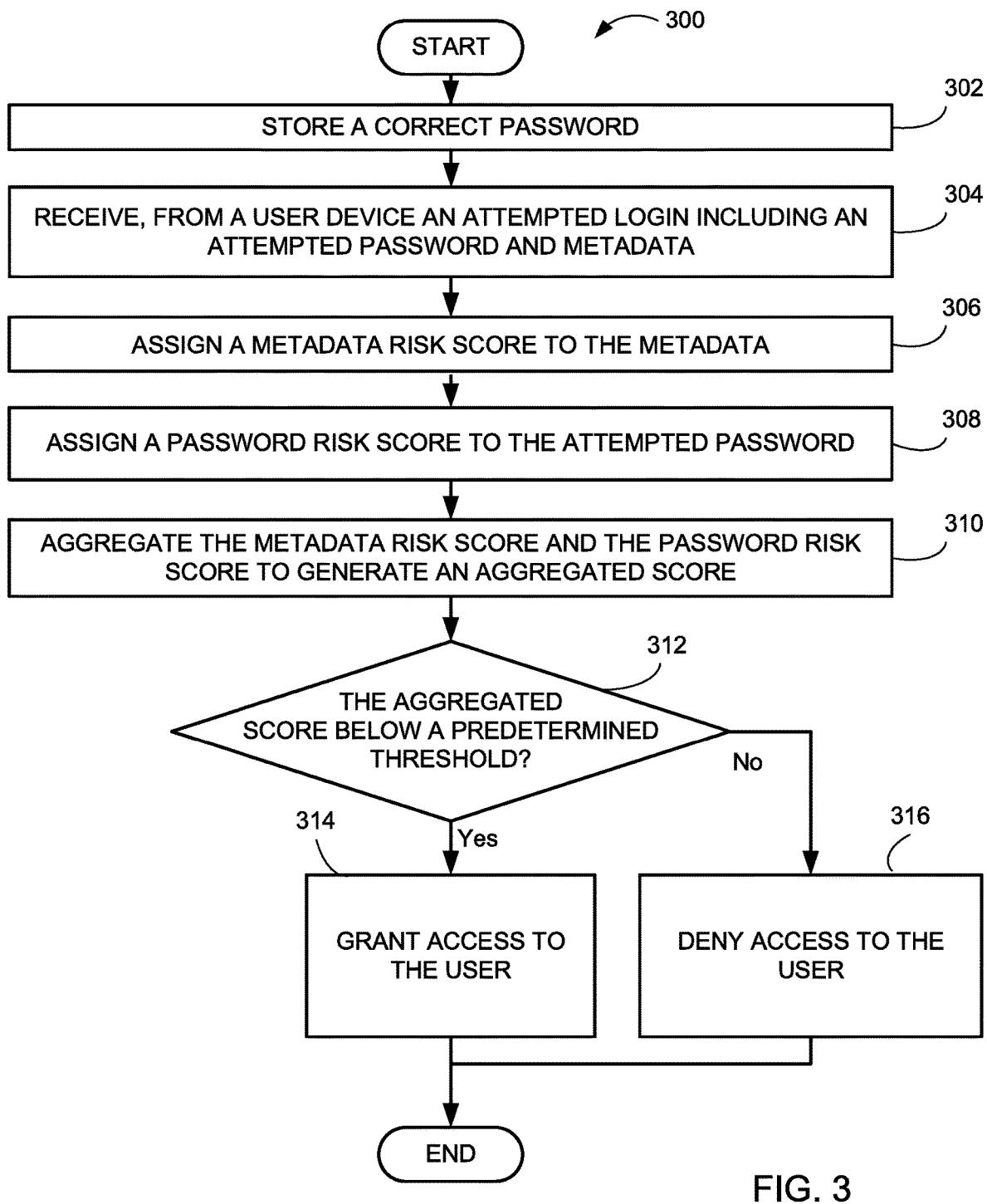
FIG. 3 is a flowchart of an example method for determining whether to grant access to a user when an attempted password includes one or more errors.

FIG. 3 shows a flowchart of a method 300 for selectively and securely granting access to a user (e.g., to a device, application, website, network, or other secure interface) when an attempted password includes at least one error. Method 300 may be performed by some or all of user devices 102, 103, web server 110, database 118, and risk score system 120.

In block 302, system 100 (e.g., database 118) may store a correct password. The correct password may be associated with a username and a user profile. The correct password may be user specific, device specific, or both. The correct password may be entered (e.g., provided by the user or generated by system 100) during a setup phase of the user profile for a website access, a website account access, network access (e.g., virtual private network (VPN) access), user device 102, 103 access, etc. Additionally, the system (e.g., database 118) may store previous attempted passwords associated with the username.

In block 304, system 100 (e.g., risk score system 120) may receive, from a user device (e.g., user device 102), an attempted login including (1) an attempted password and (2) metadata associated with the user device. The attempted password may include a plurality of characters which includes at least one character error. The at least one character error may be a character that is different from a corresponding correct character in a correct password or a different case (e.g., a capital letter when the correct character is lower case). The metadata may include user device location information, MAC ID of the user device, and an attempted login time.

In block 306, the system (e.g., risk score system 120) may assign a metadata risk score to the metadata (e.g., user device location information, MAC ID of the user device, and an attempted login time). Assigning the metadata risk score may be based on the user device location (e.g., geographical location of the user device based on GPS data, an Internet protocol address, cellular triangulation data, or some combination thereof), the MAC ID of the user device, and the attempted login time. Each time a user attempts to login to a system, device, network, application, etc., the location and MAC ID of the user device and/or the attempted login time is received and stored by the system (e.g., database 118). Once the system receives a minimum number of login attempts (e.g., nine login attempts), the system (e.g., via risk score system 120) will start to form one or more clusters or groupings of datapoints associated with the user device metadata for each login attempt. For example, the metadata for each login attempt may be plotted onto a graph by the various features of the metadata (e.g., the location and MAC ID of the user device and/or the attempted login time). The system may identify commonalities between the plotted points representing each login attempt and define one or more clusters based on these commonalities. Because of the metadata being collected in some embodiments, the clusters are both user- and device-specific (e.g., metadata associated with login attempts for John Doe's smart phone form a first cluster, metadata associated with login attempts for John Doe's laptop form a second cluster, and metadata associated with login attempts for Jane Smith's smart phone form a third cluster). When a new attempted login includes metadata that is the same or approximately the same as past metadata such that the system determines that the metadata of the new attempted login falls within an existing cluster, the system (e.g., risk score system 120) assigns a lower metadata risk score compared to when the new attempted login metadata is not the same or approximately the same as past metadata such that the system determines that the metadata of the new attempted login falls outside of all existing (known user device/metadata) cluster(s). This can be done by using any kind of clustering algorithm (e.g., nearest neighbors) and then checking the distance from the centroid or nearest node as part of a cluster. Specifically, the system (e.g., risk score system 120) may assign a lower metadata risk score when the user device location information matches a previous user device location information (e.g., the user device location indicates that the device is in the user's office) as compare to when the user device location information does not match a previous user device location information (e.g., the user device location indicates that the device is out of the country). The system (e.g., via risk score system 120) may assign a lower metadata risk score when the MAC ID of the user device matches a stored MAC ID in database 118 as compared to when the MAC ID of the user device does not match a stored MAC ID in the database 118. The system (e.g., via risk score system 120) may assign a lower metadata risk score when the attempted login time falls within a predetermined range of times based on previous attempted login times as compared to when the attempted login time does not fall within a predetermined range of times based on previous attempted login times.

In block 308, the system (e.g., via risk score system 120) may assign a password risk score to the attempted password. The password risk score may be based on a quantity of character errors the attempted password contains. The password risk score may be based on a distance on a keyboard the at least one character error is from a corresponding correct character. For example, if the correct character is a "d" and the at least one character error is an "s," the distance between the correct character and the character error is one key. In another example, if the correct character is a "d" and the character error is an "a," the distance between the correct character and the character error is two keys. In the first example, system (e.g., via risk score system 120) may assign lower password risk score to the attempted password than in the second example high lowlihood that a mistype would be one keys off and not two keys off.

In some embodiments, the system (e.g., via risk score system 120) may receive a typing speed of the attempted password. In some embodiments, assigning the password risk score to the attempted password is based at least in part on the received typing speed of the attempted password. When the typing speed is high (e.g., above a predetermined threshold), the system may assign a lower password risk score to the attempted password compared to when the typing speed is low (e.g., below a predetermined threshold). In some embodiments, assigning the password risk score is based at least in part on an incorrect password history, which may include a frequency of password errors (e.g., the user frequently makes different errors when typing passwords on the mobile device). The system (e.g., risk score system 120) may assign a lower password risk score may when there is a higher frequency of password errors associated with a particular user device. For example, because a users' fingers are larger than the virtual keyboard on a smart phone, a user may be more apt to make mistakes in typing a password on such a device. To compensate, the system may assign a lower password risk score to an attempted password associated with a particular user device. In some embodiments, the incorrect password history may include a common historical error (e.g., the user commonly selects the "m" key instead of the "n" key when typing the password "Frozen1234!"). In some embodiments, the system (e.g., risk score system 120) may determine whether the at least one character error matches the common historical error. When the at least one character error matches the common historical error, the system (e.g., risk score system 120) may decrease the password risk score (or assign a lower password risk score). When the at least one character error does not match the common historical error, the system (e.g., risk score system 120) may increase the password risk score (or assign a high password risk score).

In block 310, the system (e.g., via risk score system 120) may aggregate the metadata risk score and the password risk score to generate an aggregated score. In some embodiments, the system (e.g., risk score system 120) may weight the metadata risk score and the password risk score to value one score more than the other. The weighting may be generated via user input (e.g., set or dynamically set by a user) or may be automatically determined by the system. The user or system administrator may arbitrarily set the weighting or may conduct experimentation to determine how to set the weighting. For instance, if the cases of hijacking an account was higher if the metadata was weighted higher than the password risk score, then the user may opt to lower the amount that that the metadata impacts the model. Alternatively, another model may determine the weighting to set the metadata risk score and the password risk score and components of those scores. As an example, the system (e.g., risk score system 120) may weigh the password risk score higher than the metadata risk score or vice versa. As one specific example, the password risk score (e.g., 54) may be weighted by a factor of 1.5 (e.g., weighted value of 81) while the metadata risk score (e.g., 40) may have be weighted by a factor of 1.0 (e.g., weighted value of 40) for an aggregated score of 121.

In block 312, the system (e.g., via risk score system 120) may determine whether the aggregated score is below a predetermined threshold (instead or in addition to determining whether the score is below a predetermined threshold, an example embodiment may determine whether the score is above (or at or above) a predetermined threshold, and granting or denying access may be based on said determination). For example, the system (e.g., via risk score system 120) may set a predetermined threshold to be 150. In block 314, the system (e.g., via risk score system 120) may grant access to the user when the aggregated score is below a predetermined threshold. In block 316, the system (e.g., via risk score system 120) may deny access to the user device when the aggregated score is not below a predetermined threshold. Access is defined as access to data or other information such as a website, an account (e.g., email, banking, credit card account), an application, a network, a virtual private network, a user device (e.g., a computer, a tablet, a mobile device, or a smart watch), an Internet of things (IoT) device (e.g., a heating and cooling controller).

In some embodiments, the system utilizes a second two-factor predetermined threshold. When the aggregated score exceeds the predetermined threshold but does not exceed the two-factor predetermined threshold, the system may simultaneously (or near simultaneously) prompt the user for a two-factor authentication code and transmit the two-factor authentication code to a user's email, text message, or via voice to the user's cellular phone or landline phone. The system may then receive the authentication code via user input. After receiving the authentication code, the system (e.g., via risk score system 120), may grant access to the user device (e.g., user device 102).

Figure 4:
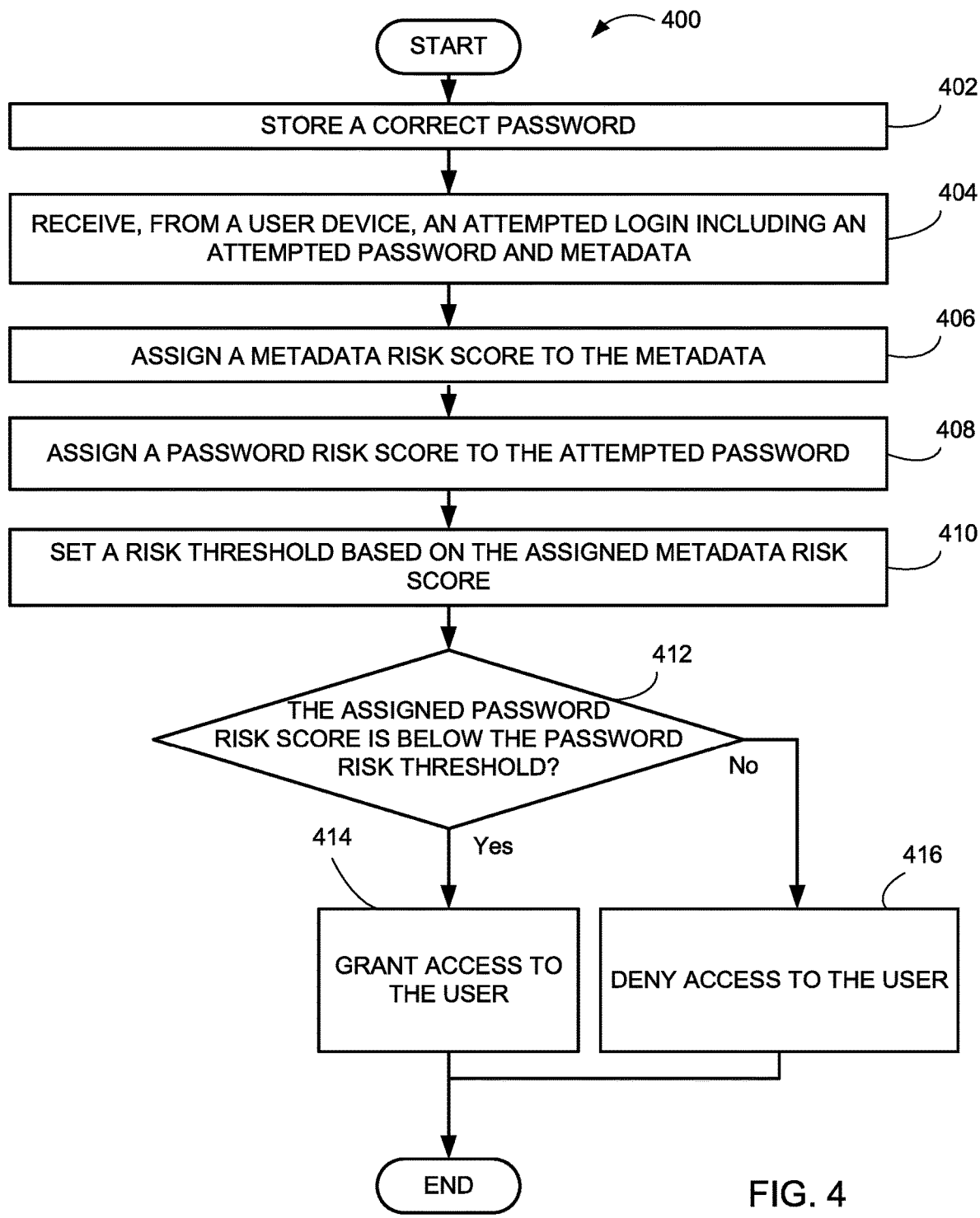
FIG. 4 is a flowchart of an example method for determining whether to grant access to a user when an attempted password includes one or more errors.

FIG. 4 shows a flowchart of a method 400 for securely granting access to a user device when an attempted password includes at least one error. Method 400 may be performed by some or all of user devices 102, 103, web server 110, database 118, and risk score system 120. Method 400 is similar to method 300 except that blocks 410, 412, 414, and 416 recite different method steps. However, blocks 402, 404, 406, and 408 are substantially similar to blocks 302, 304, 306 and 308 and incorporate by reference the descriptions from blocks 302, 304, 306, and 308. Thus, for ease of reference and conciseness, the descriptions of blocks 302, 304, 306 and 308 will not be repeated for blocks 402, 404, 406, and 408.

In block 410, the system (e.g., risk score system 120) may set a password risk threshold based on the assigned metadata risk score. In some embodiments, the system (e.g., risk score system 120) dynamically adjusts the password risk threshold such that the password risk threshold (i) increases as the assigned metadata risk score increases and (ii) decreases as the assigned metadata risk score decreases.

In determination block 412, the system (e.g., risk score system 120) may determine whether the assigned password risk score is below the password risk threshold (instead or in addition to determining whether the score is below a predetermined threshold, an example embodiment may determine whether the score is above (or at or above) a predetermined threshold, and granting or denying access may be based on said determination). In block 414, the system (e.g., risk score system 120) may grant access to the user when the assigned password risk score is below the password risk threshold. In block 416, the system (e.g., risk score system 120) may deny access to the user device when the assigned password risk score does is not below the password risk threshold.

Figure 5:
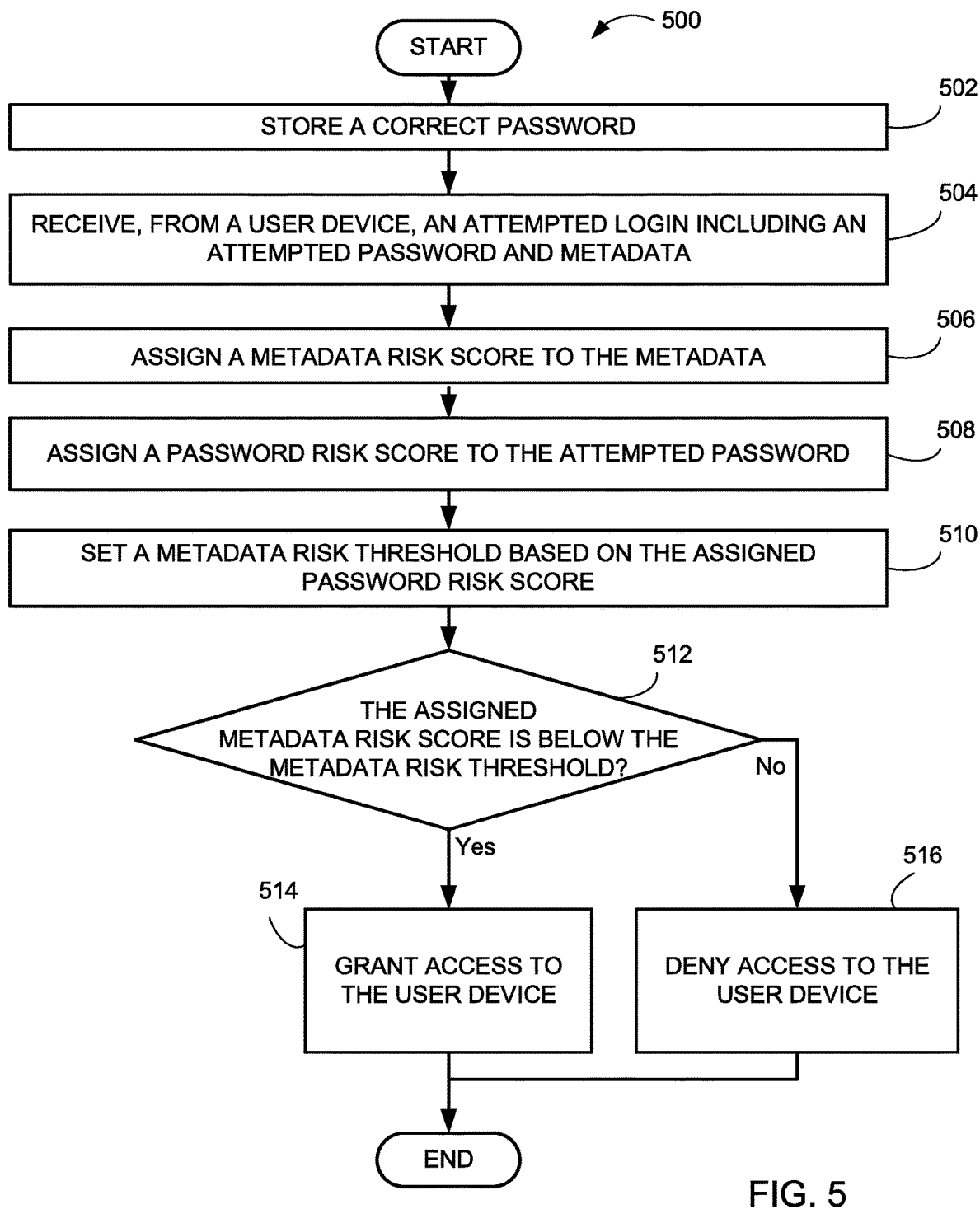
FIG. 5 is a flowchart of an example method for determining whether to grant access to a user device when an attempted password includes one or more errors.

FIG. 5 shows a flowchart of a method 500 for securely granting access to a user device when an attempted password includes at least one error. Method 500 may be performed by some or all of user devices 102, 103, web server 110, database 118, and risk score system 120. Method 500 is similar to method 300 except that blocks 510, 512, 514, and 516 recite different method steps. However, blocks 502, 504, 506, and 508 are substantially similar to blocks 302, 304, 306 and 308 and incorporate by reference the descriptions from blocks 302, 304, 306, and 308. Thus, for ease of reference and conciseness, the descriptions of blocks 302, 304, 306 and 308 will not be repeated for blocks 502, 504, 506, and 508.

In block 510, the system (e.g., risk score system 120) may set a metadata risk threshold based on the assigned password risk score. In some embodiments, the system (e.g., risk score system 120) dynamically adjusts the metadata risk threshold such that the metadata risk threshold (i) increases as the assigned password risk score increases and (ii) decreases as the assigned password risk score decreases.

In determination block 512, the system (e.g., risk score system 120) may determine whether the assigned metadata risk score is below the metadata risk threshold (instead or in addition to determining whether the score is below a predetermined threshold, an example embodiment may determine whether the score is above (or at or above) a predetermined threshold, and granting or denying access may be based on said determination). In block 514, the system (e.g., risk score system 120) may grant access to the user device when the assigned metadata risk score is below the metadata risk threshold. In block 516, the system (e.g., risk score system 120) may deny access to the user device when the assigned metadata risk score is not exceed the metadata risk threshold.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description.

References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly or indirectly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of a typical user flow pattern. They are intended solely for explanatory purposes and not in limitation. An authorized user may attempt to access a secure website associated with his bank account. When entering a username and an attempted password as part of a first login attempt via a mobile device (e.g., user device 102), the user types an "s" as the final character of the attempted password instead of a "d" as listed in the correct password stored by the system (e.g., via database 118). When the system (e.g., via risk score system 120) receives the attempted login including the attempted password with at least one error (e.g., the letter "s" in place of a "d") and metadata (e.g., user device location information, MAC ID of the user device, and an attempted login time), it assigns a metadata risk score to the metadata (e.g., based on the user device location (e.g., geographical location of the user device based on GPS data, an Internet protocol address, cellular triangulation data, or some combination thereof), the MAC ID of the user device, and the attempted login time) and a password risk score to the attempted password (e.g., based on a quantity of character errors the attempted password contains, a distance on a keyboard the at least one character error is from a corresponding correct character, the received typing speed of the attempted password, a frequency of password errors, and/or a common historical error). The system (e.g., via risk score system 120) optionally weights (set by user input or learned using a known dataset and optimized for best results) and then aggregates the metadata risk score and the password risk score to generate an aggregated score. The system (e.g., via risk score system 120) determines whether the aggregated score exceeds a predetermined threshold. When the aggregated score exceeds a predetermined threshold, the system (e.g., via risk score system 120) may deny website account access to the user device (e.g., user device 102). But when the aggregated score does not exceed a predetermined threshold, the system (e.g., via risk score system 120) may grant website account access to the user device (e.g., user device 102). In some embodiments, there may be a second two-factor predetermined threshold. When the aggregated score exceeds the predetermined threshold but does not exceed the two-factor threshold, the system may simultaneously prompt the user for a two-factor authentication code and transmit the two-factor authentication code to a user's email, text message, or via voice to the user's cellular phone or landline phone. The system may then receive the authentication code via user input. After receiving the authentication code, the system (e.g., via risk score system 120), may grant website account access to the user device (e.g., user device 102).

In another example, a user may set up an account with a financial services website (e.g., an online banking website) that includes creating a user name and password. When setting up the account, the system (e.g., via risk score system 120) may receive metadata (e.g., the location and MAC ID of the user device and/or the attempted login time) associated with the creation of the account and store that metadata in database 118. For example, the user may have set up the account having a device location at home (e.g., IP address of 10.0.1.6) using their mobile device having a MAC ID of 35-09-AB-9D-AD-23 at 7:15 AM (EDT). Following the initial set up of the account, the user may attempt to log in to check the user's bank accounts using his work computer having MAC ID of 95 B9 6D 0B 46 A4 at work (e.g., IP address of 10.254.224.165) at 9:30 AM (EDT). Each time a user attempts to login to the website, the location and MAC ID of the user device and/or the attempted login time is received and stored by the system (e.g., via database 118). Once the system receives a minimum number of login attempts (e.g. nine login attempts), the system (e.g., via risk score system 120) will start to form clusters (e.g., matches or approximate matches of metadata) surrounding the different collected metadata (e.g., the user's device location, the MAC ID of the user device, and/or the attempted login time). After the minimum number of login attempts has been achieved, a first cluster of logins may show that a user attempts to login to the financial services website in at home (e.g., IP address of 10.0.1.6) between time of 7-7:30 AM in the morning using the user's mobile device (e.g., MAC ID of 35-09-AB-9D-AD-23). A second cluster of logins may show that the user attempts to login to the financial services website at work (e.g., IP address of 10.254.224.165) between 9-10:00 AM in the morning using a work computer (e.g., MAC ID of 95 B9 6D 0B 46 A4).

If the user attempts to login using a new device (e.g., a unrecognized MAC ID), then the system (e.g., via risk score system 120) may determine that the login attempt does not fall within any of the existing clusters and assign a high metadata risk score (e.g., 99) to that login attempt, which may result in the system (e.g., via risk score system 120) setting a password risk threshold that is low enough (e.g., 5) to essentially require user to enter the correct password without errors to gain access to the financial services website because the attempted password would have to be correct to receive the lowest password risk score (e.g., 0). If, however, the user attempts to login using his mobile device (e.g., MAC ID of 35-09-AB-9D-AD-23) at home (e.g., IP address of 10.0.1.6) at 7:00 AM (EDT), the system (e.g., risk score system 120) may assign a low metadata risk score (e.g., 5) because the system (e.g., risk score system 120) determined that the MAC ID and the IP address of the attempted login are matches (e.g., fall within an existing cluster for an authorized user and a recognized device for that user) to prior login attempts and the login time is within a predetermined time window (e.g., an hour) of the early morning average cluster time (e.g., 7:15 am EDT) for attempting to login to the financial services website using the user's mobile device at home. When the system (e.g., risk score system 120) assigns the low metadata risk score (e.g., 5), the system (e.g., risk score system 120) may set a password risk threshold that is high enough (e.g., 80) to essentially allow the user to enter an attempted password with one or more errors and still gain access to the financial services website. If the user attempts to login using his mobile device (e.g., MAC ID of 35-09-AB-9D-AD-23) at home (e.g., IP address of 10.0.1.6) at 3:00 AM (EDT), the system (e.g., via risk score system 120) may assign a medium-low metadata risk score (e.g., 35) because the system (e.g., via risk score system 120) determined that the MAC ID and the IP address of the attempted login are matches (within their respective clusters) to prior login attempts, but that login time is outside of a predetermined time window (e.g., an hour) of the early morning average cluster time (e.g., 7:15 am EDT) for attempting to login to the financial services website using the user's mobile device at home. When the system (e.g., via risk score system 120) assigns the medium low metadata risk score (e.g., 35), it may set a password risk threshold that is high enough (e.g., 68) to authenticate the user (and in turn, provide access to the financial services website) even when an attempted password contains one or more errors.

Next, the user's actual password attempt is taken into consideration. The system (e.g., via risk score system 120) may assign a password risk score based on one or more factors (e.g., typing speed, number or character errors, whether a character matches a common historical error, and a frequency of character errors) that affect whether the system will grant access to the user. If the user submits an attempted password with a predetermined number of errors (e.g., three or more errors), the system (e.g., via risk score system 120) may assign a high password risk score (e.g., 85). However, if the user submits an attempted password with an error (e.g., one character error) that is less than a predetermined number of errors (e.g., three or more errors), then the system (e.g., via risk score system 120) may assign a lower risk password risk score (e.g., 35). The system (e.g., via risk score system 120) may determine whether the error matches a common historical error. If so, it may lower the password risk score further (e.g., to 15 from 35). In making this determination, the system (e.g., via risk score system 120) may also take into account typing speed. If received typing speed from the user's attempted password is above a predetermined typing threshold (e.g., 200 characters per minute), it may lower the password risk score by a predetermined amount (e.g., by 10) or may simply assign a lower password risk score. The system (e.g., via risk score system 120) may also take into account the frequency of character error (e.g., the number of times errors are made in association with a particular device). If the frequency of character errors is above a frequency error threshold (e.g., the last three attempted passwords contained at least one error) for the user's mobile device, the user's attempted password is above a predetermined typing threshold (e.g., 200 characters per minute), it may lower the password risk score by a predetermined amount (e.g., by 10) or may simply assign a lower password risk score because a user is more likely to make typing unintentional typing errors when typing faster. Once the password risk score is assigned by the system (e.g., via the risk score system 120), it may determine whether the password risk score exceeds the password risk threshold (set based on the assigned metadata risk score). If the password risk score exceeds the password risk threshold, the system (e.g., via the risk score system 120), then it may deny the user (or user device) access to the financial services website or a personal account on the website. If the password risk score does not exceed the password risk threshold, the system (e.g., via the risk score system 120) may grant the user (or user device) access to the financial services website or a personal account on the website.

In a slight variation of the prior example, the system (e.g., via risk score system 120) may set a metadata risk threshold based on the assigned password risk score. Once the metadata risk score is assigned by the system (e.g., via risk score system 120), it may determine whether the metadata risk score exceeds the password risk threshold (set based on the assigned metadata risk score). If the metadata risk score exceeds the metadata risk threshold, the system (e.g., via risk score system 120) may deny the user (or user device) access to the financial services website or a personal account on the website. If the metadata risk score does not exceed the metadata risk threshold, the system (e.g., via risk score system 120) may grant the user (or user device) access to the financial services website or a personal account on the website.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:

1. A system for allowing one or more password errors, the system comprising:
   one or more processors; and
   a memory in communication with the one or more processors and storing instructions that, when executed by the one or more processors, are configured to cause the system to:
      store a correct password for a user;
      store at least one common historical error for the user based on a same character error found in at least two previously attempted passwords;
      receive, from a user device, an attempted login comprising (1) an attempted password comprising a plurality of characters, wherein the plurality of characters comprises at least one character error, and (2) metadata, wherein the metadata comprises user device location information, media access control identification (MAC ID) of the user device, and an attempted login time;
      assign a metadata risk score to the metadata;
      determine whether the at least one character error matches the at least one common historical error for the user;
      when the at least one character error matches the at least one common historical error for the user, assign a first password risk score to the attempted passwords;
      when the at least one character error does not match the at least one common historical error for the user, assign a second password risk score to the attempted password, wherein the first password risk score is lower than the second password risk score;
      aggregate the metadata risk score and the first password risk score or second password risk score to generate an aggregated score;
      determine whether the aggregated score is below a predetermined threshold;
      when the aggregated score is below the predetermined threshold, grant access to the user;
      when the aggregated score is not below the predetermined threshold:
         determine whether the aggregated score is below a two-factor authentication threshold;
         when the aggregated score is not below the predetermined threshold but is below the two-factor authentication threshold:
            prompt the user for a two-factor authentication code;
            transmit the two-factor authentication code to the user via email or text message;
            grant or deny access based on whether the two-factor authentication code is received via user input; and
         when the aggregated score is not below the predetermined threshold or the two-factor authentication threshold, deny access to the user.

2. The system of claim 1, wherein assigning the metadata risk score is based on the user device location information, the MAC ID of the user device, the attempted login time, or some combination thereof.

3. The system of claim 1, wherein the user device location information comprises a geographical location of the user device based on global positioning system (GPS) data, an Internet protocol address, cellular triangulation data, or some combination thereof.

4. The system of claim 1, wherein:
   assigning the metadata risk score is based on (a) the user device location information and a previous user device location information, (b) the MAC ID of the user device and a stored MAC ID, (c) the attempted login time and previous attempted login times, or (d) some combination thereof.

5. The system of claim 1, wherein assigning the first password risk score or the second password risk score is based on a quantity of character errors the plurality of characters contains.

6. The system of claim 1, wherein assigning the first password risk score or the second password risk score is based on a distance on a keyboard the at least one character error is from a corresponding correct character.

7. The system of claim 1, wherein assigning the first password risk score or the second password risk score is based on a typing speed of the attempted password.

8. The system of claim 6, wherein assigning the first password risk score or the second password risk score is further based on a quantity of character errors that the plurality of characters contain.

9. The system of claim 1, wherein assigning the first password risk score or the second password risk score is based on a frequency of the at least one common historical error.

10. A system for allowing one or more password errors, the system comprising:
    one or more processors; and
    a memory in communication with the one or more processors and storing instructions that, when executed by the one or more processors, are configured to cause the system to:
       store a correct password for a user;
       store at least one common historical error for the user based on a same character error found in at least two previously attempted passwords;

receive, from a user device, an attempted login comprising (1) an attempted password comprising a plurality of characters, wherein the plurality of characters comprises at least one character error, and (2) metadata, wherein the metadata comprises user device location information, media access control identification (MAC ID) of the user device, and an attempted login time;

assign a metadata risk score to the metadata;

determine whether the at least one character error matches a common historical error for the user;

when the at least one character error matches the common historical error for the user, assign a first password risk score to the attempted passwords;

when the at least one character error does not match the common historical error for the user, assign a second password risk score to the attempted password, wherein the first password risk score is lower than the second password risk score;

set a password risk threshold based on the metadata risk score;

determine whether the first password risk score or the second password risk score is below the password risk threshold;

when the first password risk score or the second password risk score is below the password risk threshold, grant access to the user;

when the first password risk score or the second password risk score is not below the password risk threshold:

determine whether the first password risk score or the second password risk score is below a two-factor authentication threshold;

when the first password risk score or the second password risk score is not below the password risk threshold but is below the two-factor authentication threshold:

prompt the user for a two-factor authentication code;

transmit the two-factor authentication code to the user via email or text message;

grant or deny access based on whether the two-factor authentication code is received via user input; and when the first password risk score or the second password risk score is not below the password risk threshold or the two-factor authentication threshold, deny access to the user.

11. The system of claim 10, wherein assigning the metadata risk score is based on the user device location information, the MAC ID of the user device, the attempted login time, or some combination thereof.

12. The system of claim 10, wherein the user device location information comprises a geographical location of the user device based on global positioning system (GPS) data, an Internet protocol address, cellular triangulation data, or some combination thereof.

13. The system of claim 10, wherein assigning the metadata risk score is based on (a) the user device location information and a previous user device location information, (b) the MAC ID of the user device and a stored MAC ID, (c) the attempted login time and previous attempted login times, or (d) some combination thereof.

14. The system of claim 10, wherein assigning the first password risk score or the second password risk score is based on a quantity of character errors the plurality of characters contains.

15. The system of claim 10, wherein assigning the first password risk score or the second password risk score is based on a distance on a keyboard the at least one character error is from a corresponding correct character.

16. The system of claim 10, wherein assigning the first password risk score or the second password risk score is based on a typing speed of the attempted password.

17. The system of claim 16, wherein assigning the first password risk score or the second password risk score is based on a distance on a keyboard the at least one character error is from a corresponding correct character.

18. The system of claim 10, wherein assigning the first password risk score or the second password risk score is based on a frequency of password errors.

19. A system for allowing one or more password errors, the system comprising:

one or more processors; and a memory in communication with the one or more processors and storing instructions that, when executed by the one or more processors, are configured to cause the system to:

store a correct password for a user;

store at least one common historical error for the user based on a same character error found in at least two previously attempted passwords;

receive, from a user device, an attempted login comprising (1) an attempted password comprising a plurality of characters, wherein the plurality of characters comprises at least one character error and (2) metadata, wherein the metadata comprises user device location information, media access control identification (MAC ID) of the user device, and an attempted login time;

assign a metadata risk score to the metadata;

determine whether the at least one character error matches at least one common historical error for the user;

when the at least one character error matches the at least one common historical error for the user, assign a first password risk score to the attempted passwords;

when the at least one character error does not match the at least one common historical error for the user, assign a second password risk score to the attempted password, wherein the first password risk score is lower than the second password risk score;

set a metadata risk threshold based on the first password risk score or the second password risk score;

determine whether the metadata risk score is below the metadata risk threshold;

when the metadata risk score is below the metadata risk threshold, grant access to the user;

when the metadata risk score is not below the metadata risk threshold:

determine whether the metadata risk score is below a two-factor authentication threshold;

when the metadata risk score is not below the metadata risk threshold but is below the two-factor authentication threshold:

prompt the user for a two-factor authentication code;

transmit the two-factor authentication code to the user via email or text message;

grant or deny access based on whether the two-factor authentication code is received via user input; and when the metadata risk score is not below the metadata risk threshold or the two-factor authentication threshold, deny access to the user.

20. The system of claim 19, wherein assigning the metadata risk score is based on the user device location information, the MAC ID of the user device, the attempted login time, or some combination thereof.

21. The system of claim 19, wherein the user device location information comprises a geographical location of the user device based on global positioning system (GPS) data, an Internet protocol address, cellular triangulation data, or some combination thereof.

22. The system of claim 19 wherein assigning the metadata risk score is based on (a) the user device location information and a previous user device location information, (b) the MAC ID of the user device and a stored MAC ID, (c) the attempted login time and previous attempted login times, or (d) some combination thereof.

23. The system of claim 1, wherein the first password risk score and the second password risk score are numbers between 1 and 100, percentages, ratios, or 32-bit floating-point numbers between 0 and 1.

24. The system of claim 1, wherein the metadata risk score is a number between 1 and 100, a percentage, a ratio, or a 32-bit floating-point number between 0 and 1.

25. The system of claim 24, wherein the metadata is associated with a profile of the user.

26. The system of claim 1, wherein the memory is stored further instructions configured to cause the one or more processors to:
  determine whether the user device location information matches a previous user device location information;
  when the user device location information matches the previous user device location information, generate the metadata risk score with a first value; and
  when the user device location information does not match the previous user device location information, generate the metadata risk score with a second value greater than the first value.

27. The system of claim 1, wherein the memory is stored further instructions configured to cause the one or more processors to:
  determine whether the MAC ID of the user device matches a stored MAC ID for the user device;
  when the MAC ID of the user device matches the stored MAC ID for the user device, generate the metadata risk score with a first value; and
  when the MAC ID of the user device does not match the stored MAC ID for the user device, generate the metadata risk score with a second value greater than the first value.

28. The system of claim 1, wherein the memory is stored further instructions configured to cause the one or more processors to:
  determine whether the attempted login time falls within a predetermined range of times based on previous attempted login times;
  when the attempted login time falls within the predetermined range of times based on the previous attempted login times, generate the metadata risk score with a first value; and
  when the attempted login time falls outside of the predetermined range of times based on the previous attempted login times, generate the metadata risk score with a second value greater than the first value.

29. The system of claim 1, wherein aggregating the metadata risk score comprises weighing the first password risk score or the second password risk score higher than the metadata risk score.

30. The system of claim 1, wherein the access is access to a website, an account, an application, a network, a virtual private network, a user device, an Internet of things (IoT) device.

* * * * *